United States Patent
Van Den Berg et al.

(10) Patent No.: US 7,231,886 B2
(45) Date of Patent: Jun. 19, 2007

(54) TEAT CUP CARRIER

(75) Inventors: Karel Van Den Berg, Bleskensgraaf (NL); Greorgius Rudolphius Bos, Bolsward (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 10/962,580

(22) Filed: Oct. 13, 2004

(65) Prior Publication Data

US 2005/0076841 A1     Apr. 14, 2005

(30) Foreign Application Priority Data

Oct. 13, 2003  (NL)  .................................. 1024522

(51) Int. Cl.
  *A01J 3/00*  (2006.01)
  *A01J 5/00*  (2006.01)
(52) U.S. Cl. ................................... 119/14.11
(58) Field of Classification Search ............ 14/1, 14/11, 3, 18; 119/14.1, 14.03, 14.04, 14.08, 119/14.11, 14.18
See application file for complete search history.

(56) References Cited

U.S. PATENT DOCUMENTS

| | | | | |
|---|---|---|---|---|
| 366,810 A | * | 7/1887 | Beyer et al. ............. | 119/14.11 |
| 1,066,430 A | * | 7/1913 | Jenkins .................... | 119/14.11 |
| 2,358,000 A | | 9/1944 | Cornell | |
| 2,631,566 A | * | 3/1953 | Roop ...................... | 119/14.09 |
| 3,095,854 A | * | 7/1963 | Bott et al. ............... | 119/14.04 |
| 3,103,912 A | | 9/1963 | Benedetto et al. | |
| 3,198,122 A | * | 8/1965 | Kinsey et al. ........... | 119/14.11 |
| 3,279,431 A | * | 10/1966 | Simons .................... | 119/14.08 |
| 3,301,216 A | * | 1/1967 | Fleming .................. | 119/14.08 |
| 3,329,126 A | * | 7/1967 | Sparr, Sr. ................. | 119/14.11 |
| 3,385,265 A | * | 5/1968 | Schrader ................. | 119/14.18 |
| 3,456,590 A | * | 7/1969 | Sparr, Sr. ................. | 417/36 |
| 3,752,122 A | * | 8/1973 | Ciribelli .................. | 119/14.04 |
| 3,765,373 A | * | 10/1973 | Phillips ................... | 119/14.04 |
| 3,835,814 A | * | 9/1974 | Jacobs et al. ............ | 119/14.04 |
| 4,034,711 A | * | 7/1977 | Bender et al. ........... | 119/14.11 |
| 4,508,058 A | | 4/1985 | Jakobson et al. | |
| 5,000,119 A | * | 3/1991 | Moreau et al. .......... | 119/14.03 |

(Continued)

FOREIGN PATENT DOCUMENTS

EP      1 188 366 A1     3/2002

(Continued)

OTHER PUBLICATIONS

Report of a novelty search of International type.

*Primary Examiner*—Kimberly S. Smith
(74) *Attorney, Agent, or Firm*—David P. Owen; Howrey LLP

(57) ABSTRACT

A teat cup carrier is designed to be able to co-operate with a feed platform, which teat cup carrier is freely movable relative to the feed platform. The teat cup carrier carries, besides teat cups, further milking elements for milking an animal, the further milking elements including at least a milk storage vessel for storing milk, a milking vacuum source and a pulsation vacuum source. The milk storage vessel is provided with a milk outlet. The freely movable teat cup carrier is in particular a self-propelled (autonomous) mobile teat-cup-carrying robot and comprises a control unit for controlling the functioning of the mobile teat-cup-carrying robot.

20 Claims, 9 Drawing Sheets

U.S. PATENT DOCUMENTS

| | | | | |
|---|---|---|---|---|
| 5,042,428 A * | 8/1991 | Van der Lely et al. | ... | 119/14.08 |
| 5,056,466 A * | 10/1991 | Dessing et al. | ........ | 119/14.18 |
| 5,279,253 A * | 1/1994 | Lubberink | ............ | 119/14.08 |
| 5,934,220 A * | 8/1999 | Hall et al. | ............ | 119/14.08 |
| 6,227,142 B1 * | 5/2001 | Birk | ............ | 119/14.08 |
| 6,439,162 B1 * | 8/2002 | van den Berg | ........ | 119/174 |
| 6,532,892 B1 * | 3/2003 | Nilsson | ............ | 119/14.03 |
| 6,539,896 B1 * | 4/2003 | Larsen | ............ | 119/515 |
| 6,679,195 B1 * | 1/2004 | Birk | ............ | 119/14.03 |
| 6,802,280 B2 * | 10/2004 | M.ang.rtensson | ........ | 119/14.04 |
| 6,817,312 B2 * | 11/2004 | Battersby et al. | ........ | 119/14.04 |
| 6,843,203 B2 * | 1/2005 | Johannesson et al. | .... | 119/14.03 |
| 6,981,467 B2 * | 1/2006 | van der Lely et al. | .... | 119/14.11 |
| 2002/0033137 A1 * | 3/2002 | van der Lely et al. | ..... | 119/14.1 |
| 2002/0033138 A1 | 3/2002 | Brayer | | |
| 2002/0033139 A1 * | 3/2002 | van der Lely et al. | .... | 119/14.11 |
| 2002/0033140 A1 * | 3/2002 | Van der Lely et al. | ... | 119/14.11 |
| 2003/0154925 A1 * | 8/2003 | Van Den Berg et al. | .. | 119/14.02 |
| 2004/0020440 A1 * | 2/2004 | Guo | ........ | 119/14.03 |
| 2005/0076839 A1 * | 4/2005 | Van Den Berg et al. | .. | 119/14.04 |
| 2005/0076840 A1 * | 4/2005 | Van Den Berg et al. | .. | 119/14.04 |
| 2005/0076841 A1 * | 4/2005 | Van Den Berg et al. | .. | 119/14.11 |
| 2005/0115506 A1 * | 6/2005 | Van Den Berg et al. | .. | 119/14.03 |
| 2005/0120965 A1 * | 6/2005 | Van Den Berg et al. | .. | 119/14.02 |

FOREIGN PATENT DOCUMENTS

| | | |
|---|---|---|
| EP | 1 188 367 A1 | 3/2002 |
| EP | 1 188 368 A1 | 3/2002 |
| EP | 1 310 160 A2 | 5/2003 |
| EP | 1 336 337 A2 | 8/2003 |
| FR | 1 326 580 A | 5/1963 |
| FR | 1 463 615 A | 3/1967 |
| FR | 2 649 858 A1 | 1/1991 |
| GB | 394 530 A | 6/1933 |

* cited by examiner

TEAT CUP CARRIER

CROSS REFERENCE TO RELATED APPLICATIONS

This application claims priority from Dutch application number 1024522 filed on 13 Oct. 2003, the contents of which are hereby incorporated by reference in their entirety.

BACKGROUND OF THE INVENTION

1. Field of the Invention

The invention relates generally to teat cup carriers and more particularly to devices for carrying teat cups for use with feed platforms on which animals to be milked may be located.

2. Description of the Related Art

Teat cup carriers are known for use with movable feed platforms. In a known system a rotatable feed platform is provided with individual stalls, each containing a feed trough and teat cups. Beside the platform there is arranged a stationary teat-cup-connecting robot which is capable of connecting the teat cups to the teats of an animal that is present on the platform. Devices of this type are known from U.S. Pat. No. 4,508,058 and US A1 2002/0033138.

A drawback of the known systems is that the motion speed of the platform depends on the connection time required by the connecting robot or the farmer for connecting the teat cups. It may also occur that the teat cups cannot be connected in the connection area, so that the animal cannot be milked during its stay on the platform and has to board the platform again for being milked. This may adversely affect the milk yield as well as the animal health. Furthermore, an animal is restricted in where it can go to feed, both by the nature of the platform and by the fact that teat cup connection must take place in a specific area.

It is also known from FR-A-2,649,858 to dispose the sets of teat cups separately from the platform. The housing system as used in FR-A-2,649,858 is not explicitly described, but since the animals have to enter the circular platform from within the platform it is most likely that the animals have to be led from the outside of the platform towards the inside. In addition the assembly known from FR-A-2,649,858 also suffers from the disadvantage that a dairy animal is to be milked in a closed area, such as the stalls provided on the platform disclosed therein which limit the freedom of movement of a dairy animal to a high extent. Each stall is closed by two gates, so that this also restricts the free movement of animals since an animal has to board the platform at a specific position. Furthermore, dairy animals appear to experience walking to and boarding the platform as unpleasant and may therefore by very unwilling to be lead to the platform, which may result in problems to get an animal onto or from the platform, leading to insufficient occupation of the platform and thus reduced milk production. In addition the disclosed teat cup carriers are not freely movable with respect to the feed platform.

Movable teat cup carriers have been disclosed for use in conventional cowsheds. Such devices are however limited for operation in a fixed frame of reference. Examples of such devices are given in European patent applications EP-A-1,336,337, EP-A-1,188,366 and EP-A-1,188,367.

BRIEF SUMMARY OF THE INVENTION

According to the present invention, there is provided a teat cup carrier designed to be able to co-operate with a feed platform, the teat cup carrier being freely movable relative to the feed platform. The invention is based on the insight that the drawback in the state of the art is caused at least partially by the fact that the teat cup carrier, and consequently the teat cups, is coupled to the feed platform. By designing the teat cup carrier so as to be freely movable relative to the feed platform a higher feed consumption and milk production and a more animal-friendly milking process than expected are obtained. Moreover, the rotational speed of the feed platform no longer need depend on the connection of the teat cups and the connection of teat cups can also take place outside the connection area. Furthermore, there is created a greater freedom of construction of the feed platform, because the teat cup carriers no longer need to be disposed on the feed platform.

In an embodiment of a teat cup carrier according to the invention, the teat cup carrier comprises a teat cup gripper for gripping and retaining a teat cup that is disposed on a teat cup holder. The teat cup holder may be arranged stationarily or be movable in an alternative embodiment.

In another embodiment of a teat cup carrier according to the invention, the teat cup carrier carries, besides teat cups, further milking means for milking an animal, the further milking means comprising at least a milk storage vessel for storing milk, a milking vacuum source and a pulsation vacuum source. This means that it is not necessary to convey the milk obtained to a milk-collecting tank by means of transport lines, but that the freely movable teat cup carrier can move automatically to said milk-collecting tank when the milking of an animal has been finished. This can be determined in a manner known per se, for example when the milk flow measured by a flow meter has come below a particular threshold value.

In a further embodiment of a teat cup carrier according to the invention, the milk storage vessel is provided with a milk outlet. In an alternative embodiment, the milk storage vessel is an exchangeable milk storage vessel that may be transported for example as a whole to a milk factory.

In a preferred embodiment of a teat cup carrier according to the invention, the freely movable teat cup carrier is a self-propelled (autonomous) mobile teat-cup-carrying robot and there is provided a control unit for controlling the functioning of the mobile teat-cup-carrying robot. The control unit preferably comprises a transmitting and receiving unit for communication with a control unit, in particular a control unit of the feed platform.

Although a connecting device for connecting the teat cups to the teats of an animal may be a separate device, for the sake of simplicity of the construction it is advantageous if the teat cup carrier is provided with a connecting device for connecting a teat cup to the teats of an animal that is present on the feed platform. In a further preferred embodiment of a teat cup carrier according to the invention, the connecting device is provided with a gripping device for gripping a teat cup that is disposed on the teat cup carrier.

In order to be able correctly to connect a teat cup, in an embodiment of a teat cup carrier according to the invention, the teat cup carrier is provided with a teat-position-determining device for determining the position of a teat of an animal that is present on the feed platform. The teat-position-determining device is in particular disposed on the connecting device.

In a further embodiment of a teat cup carrier according to the invention, the connecting device comprises a robot arm, in particular for carrying the gripping device.

In a further embodiment of a teat cup carrier according to the invention, the teat cup carrier comprises a measuring device for measuring milk parameters. In this manner the teat cup carrier can determine for example whether or not an amount of milk obtained is suitable for human consumption.

In an embodiment of a teat cup carrier according to the invention, the teat cup carrier comprises a drive that is controllable by the control unit.

In a further embodiment of a teat cup carrier according to the invention, the teat cup carrier is provided with a teat-cup-cleaning device for cleaning a teat cup. This makes it possible for the teat cup carrier to ensure itself the cleaning of the teat cups.

In a further embodiment of a teat cup carrier according to the invention, the teat cup carrier is provided with a milking-pre-treatment device for performing a milking-pre-treatment on an animal on the feed platform. This makes it possible for the teat cup carrier to ensure itself the pre-treatment of an animal, in particular the teats of an animal.

In an embodiment of a teat cup carrier according to the invention, a correct pre-treatment can be obtained in that the milking-pre-treatment device is provided with a device for determining the position of a teat of an animal on the feed platform. It is in particular advantageous if the milking-pre-treatment device comprises a robot arm.

In a preferred embodiment of a teat cup carrier according to the invention, the milking-pre-treatment device comprises a spraying device for spraying and/or squirting a fluid on the teat.

In a further embodiment of a teat cup carrier according to the invention, the teat cup carrier is provided with a milking-post-treatment device for performing a milking-post-treatment on an animal on the feed platform. This makes it possible for the teat cup carrier to ensure itself the post-treatment of an animal, in particular the teats of an animal.

A correct post-treatment can be obtained if the milking-post-treatment device is provided with a device for determining the position of a teat of an animal. It is in particular advantageous if the milking-post-treatment device comprises a robot arm.

In an embodiment of a teat cup carrier according to the invention, the milking-post-treatment device comprises a spraying device for spraying and/or squirting a fluid on the teat.

According to the invention, a multifunctional teat cup carrier is obtained if the teat cup carrier is also provided with a cleaning device for cleaning the feed platform. In this case it is advantageous if the cleaning device is provided with a device for determining the degree of contamination of the platform and for emitting contamination-degree-signals. The cleaning device preferably comprises a manure slide. Alternatively or additionally, the cleaning device may comprise a rotatable cleaning brush. In a favorable embodiment of a teat cup carrier according to the invention, the cleaning device comprises a sprayer for spraying and/or squirting a fluid on the platform. The sprayer is preferably a high-pressure sprayer. An improved cleaning is obtained if the cleaning device comprises a heating element for heating the fluid. The cleaning device preferably comprises a drying device for drying the feed platform.

If the cleaning device comprises a storage container for impurities, the teat cup carrier can be active autonomously for a longer time without the impurities having to be discarded in the meantime. In an embodiment of a teat cup carrier according to the invention, the storage container is provided with an outlet for impurities. Alternatively, the storage container may be removable as a whole. The teat cup carrier is preferably provided with a cleaning device for cleaning the storage container.

In a preferred embodiment of a teat cup carrier according to the invention, the teat cup carrier is provided with navigation means for navigating the teat cup carrier. This makes it possible to achieve a correct displacement of the teat cup carrier. In this case, in a further embodiment of a teat cup carrier according to the invention, it is advantageous if the navigation means comprise position-determining means for determining the position of the teat cup carrier and for supplying position information.

The teat cup carrier is preferably provided with its own energy supply, a rechargeable energy supply being in particular suitable for the purpose.

For safety improvement, in a favorable embodiment the teat cup carrier is provided with a malfunction detector for detecting an internal malfunction. The teat cup carrier is preferably provided with an alarm-signal-issuing device for issuing an alarm signal with the aid of data from the malfunction detector. Said alarm signal may be sent for example to the farmer or the operator of the teat cup carrier to enable the person in question to take the necessary measures for repairing the malfunction. The safety of the teat cup carrier is further improved in an embodiment in which the teat cup carrier is capable of being deactivated with the aid of data from the malfunction detector.

Since an improved functioning may be obtained if the teat cup carrier is also capable of moving over the feed platform, in a favorable embodiment of a teat cup carrier according to the invention, the teat cup carrier is dimensioned in such a way that it is capable of being placed as a whole under an animal between its forelegs and hind legs.

In order to prevent the mobile robot inter alia from colliding with objects, in an embodiment of a teat cup carrier according to the invention, the mobile robot is characterized in that the teat cup carrier is provided with a proximity detector for detecting the proximity of an object. In an embodiment of a teat cup carrier according to the invention, the teat cup carrier and/or other objects may be prevented from being damaged as a result of undesired contacts with the teat cup carrier if the teat cup carrier is characterized in that it is provided with a protecting device for protecting at least a part of the teat cup carrier, which protecting device is capable of being brought from an inactive position into an active protecting position. Such a protecting device may be a protecting cap, an airbag or the like. The protecting device is in particular capable of being brought from an inactive position into an active protecting position with the aid of data from the proximity detector. In an embodiment the proximity detector comprises a camera. Alternatively or additionally, the proximity detector may comprise an approach sensor.

In an embodiment of a teat cup carrier according to the invention in which the teat cup carrier is provided with a signal-issuing device for issuing a perceptible signal, the teat cup carrier is capable of signaling its presence to its environment. Besides, said signal-issuing device may be used for making sounds audible or perceptible to an animal. In a preferred embodiment, the signal-issuing device is capable of being activated with the aid of data from the proximity detector. The proximity detector is in particular connectable to the navigation means in order to make it possible for the teat cup carrier to navigate around an obstacle.

In a further embodiment of a teat cup carrier according to the invention, the teat cup carrier is provided with an animal-recognition device for recognizing an animal. This makes it possible for the teat cup carrier to perform a different treatment per animal. The animal-recognition device is in particular connectable to the control unit for supplying recognition information to the control unit.

According to the invention there is also provided a teat cup carrier for carrying at least one teat cup for connection to a teat of an animal to be milked, the teat cup carrier being freely movable between a movable feed platform defining a moving frame of reference and a stationary area around the feed platform defining a fixed frame of reference, movement of the teat cup carrier being controlled by a navigation device, operable to direct movement of the teat cup carrier in both the fixed and moving frames of reference.

According to another aspect of the invention there is provided an assembly for use in the feeding and milking of dairy animals, comprising: a moving feeding platform on which an animal to be milked is located; a teat cup carrier for carrying at least one teat cup for connection to a teat of the animal, the teat cup carrier being freely movable relative to the moving feed platform; and a navigation device, operable to direct movement of the teat cup carrier on the moving feed platform. In particular the combination of such a moving feed platform and an independently moving teat cup carrier is considered to be highly advantageous in achieving efficient and animal friendly milking.

In a preferred embodiment, the feed platform is generally free from confining elements whereby an animal to be milked may move to any of a number of feeding places. By providing a mobile teat cup carrier, it is possible to follow the animal irrespective of where she chooses to feed.

BRIEF DESCRIPTION OF THE DRAWINGS

The invention will be explained hereinafter in further detail with reference to a number of exemplary embodiments shown in the drawings, in which.

DESCRIPTION OF ILLUSTRATIVE EMBODIMENTS

Figure 1A:
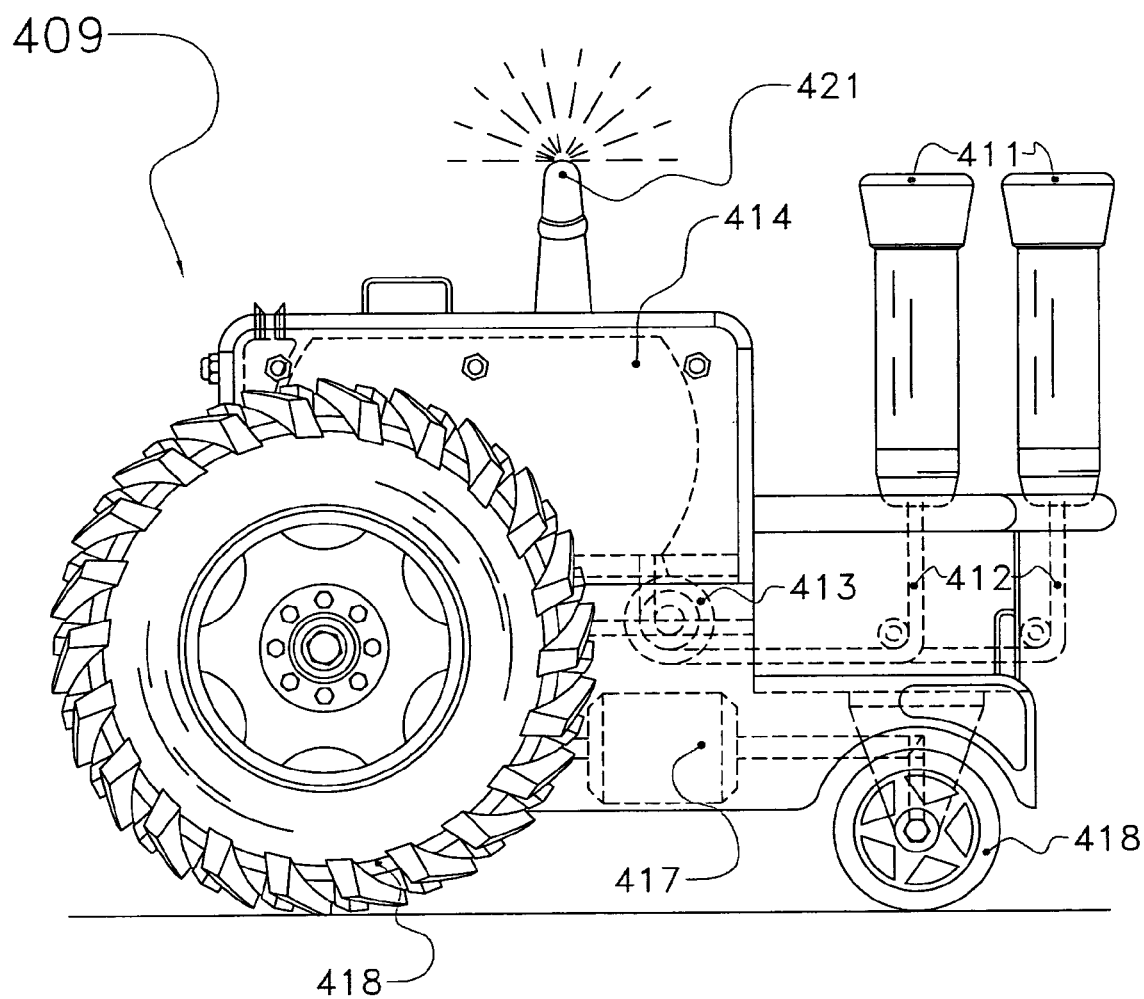
FIG. 1a shows diagrammatically in side view an embodiment of an autonomous, mobile teat-cup-carrying robot according to the invention.

To milk a cow, or another dairy animal, teat cups are connected to the teats of the cow. In the embodiment shown in FIG. 1a, the teat cups 411 are carried by an autonomous, mobile teat-cup-carrying robot 409 that is capable of moving freely on and/or beside a feed platform. The teat-cup-carrying robot 409 is shown in side view in FIG. 1a. In the embodiment shown, the mobile teat-cup-carrying robot 409 carries four teat cups 411, two of which are visible in the figure. The teat cups 411 are each connected via a teat cup line 412 to a milk storage vessel 414 to which the milk is conveyed with the aid of a vacuum pump system 413. The teat-cup-carrying robot 409 is provided with wheels 418. The wheels 418 are driven by a drive unit 417, such as an electric motor. The milk storage vessel 414 is provided on its lower side with a non-shown milk outlet through which the milk can be conveyed to a milk tank. The teat-cup-carrying robot 409 is provided with a (non-shown) position-determining device, which may be a radar, a GPS-system component or the like. This makes it possible to determine the momentary position of the teat-cup-carrying robot 409. In order to be able to co-operate with the feed platform, the teat-cup-carrying robot 409 comprises a transmitting/receiving device 421 for transmitting and receiving position data and control commands, as will be explained hereinafter in further detail.

Figure 1B:
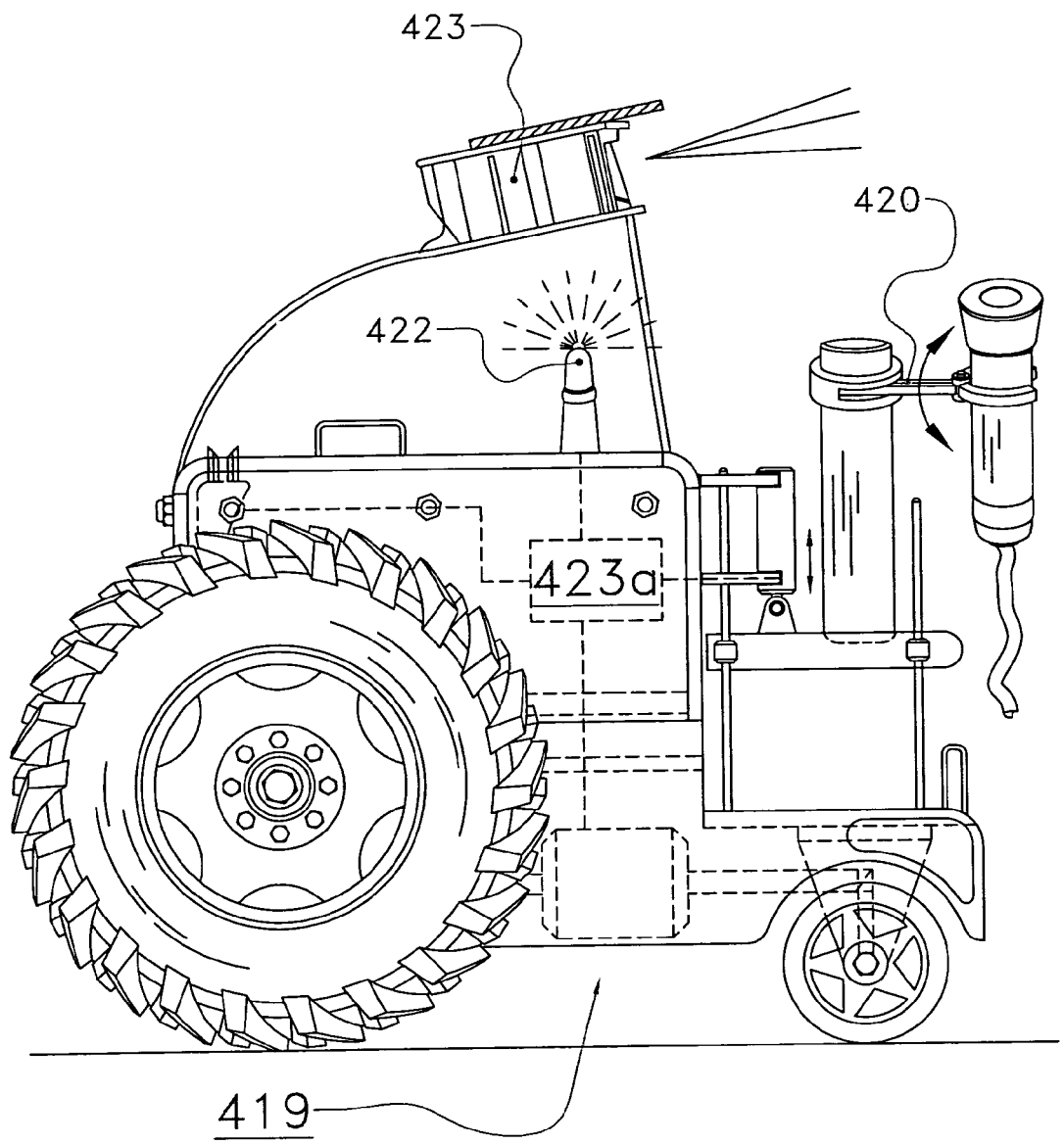
FIG. 1b shows diagrammatically in side view an embodiment of an autonomous, mobile teat-cup-connecting robot that co-operates with a mobile teat-cup-carrying robot according to the invention.

FIG. 1b shows an embodiment of a mobile, autonomous teat-cup-connecting robot 419. The teat-cup-connecting robot 419 comprises an upwardly movable teat cup gripper 420. The teat-cup-connecting robot 419 does not have a milk storage vessel. A transmitting/receiving device 422 is suitable for receiving data from the milking system control unit and is connected to a control unit 423a, which does not only ensure the control of the displacement of the mobile teat-cup-connecting robot 419, but also controls the functioning of the teat cup gripper 420. With the aid of the transmitting/receiving devices 421, 422 the teat-cup-connecting robot 419 and the teat-cup-carrying robot 409 are able to co-operate. The teat-cup-connecting robot 419 is moved to the position of a cow to be milked. This is possible by displacement across a feed platform 352 or beside a feed platform 352. At the same time the teat-cup-carrying robot 409 is moved to a position near the teat-cup-connecting robot, so that the teat cup gripper 420 of the teat-cup-connecting robot 419 is able to grip the teat cups 411 carried by the teat-cup-carrying robot 409. For this purpose there is made use of the position-determining means 423 that detect the position of the teat cups 411 on the teat-cup-carrying robot 409 and move the teat cup gripper 420 in such a way that the teat cups are gripped. The teat-cup-carrying robot 409 and the teat cup gripper 420 are then moved in such a way that a teat cup is located under a teat, after which, by moving the teat cup gripper 420 upwardly, the teat cup is connected to the teat through vacuum. During the connection the teat-cup-carrying robot 409 and the teat-cup-connecting robot 419 continue to move synchronously with each other and with the feed platform 352, which is achieved by the mutual communication by means of the transmitting/receiving devices 421, 422. When all the teat cups have been connected it is possible for the teat-cup-connecting robot 419 to move to the next cow that is to be milked, while the teat-cup-carrying robot 409 continues to move synchronously with the feed platform 352 until the milking has been finished, which can take place in a customary manner, for example by flow measurement. Although in the embodiment shown the co-operation between the teat-cup-carrying robot 409 and the teat-cup-connecting robot 419 takes place directly, and the co-operation with the feed platform takes place indirectly, it is also possible that the teat-cup-carrying robot 409 co-operates directly with the feed platform 352 and moves synchronously with the feed platform 352, for example under the control of a feeding system control unit, and that the teat-cup-connecting robot 419 grips the teat cups from the teat-cup-carrying robot by means of the position-determining means. In this case the freely moving, mobile teat-cup-carrying robot co-operates directly with the feed platform 352.

Figure 1D:
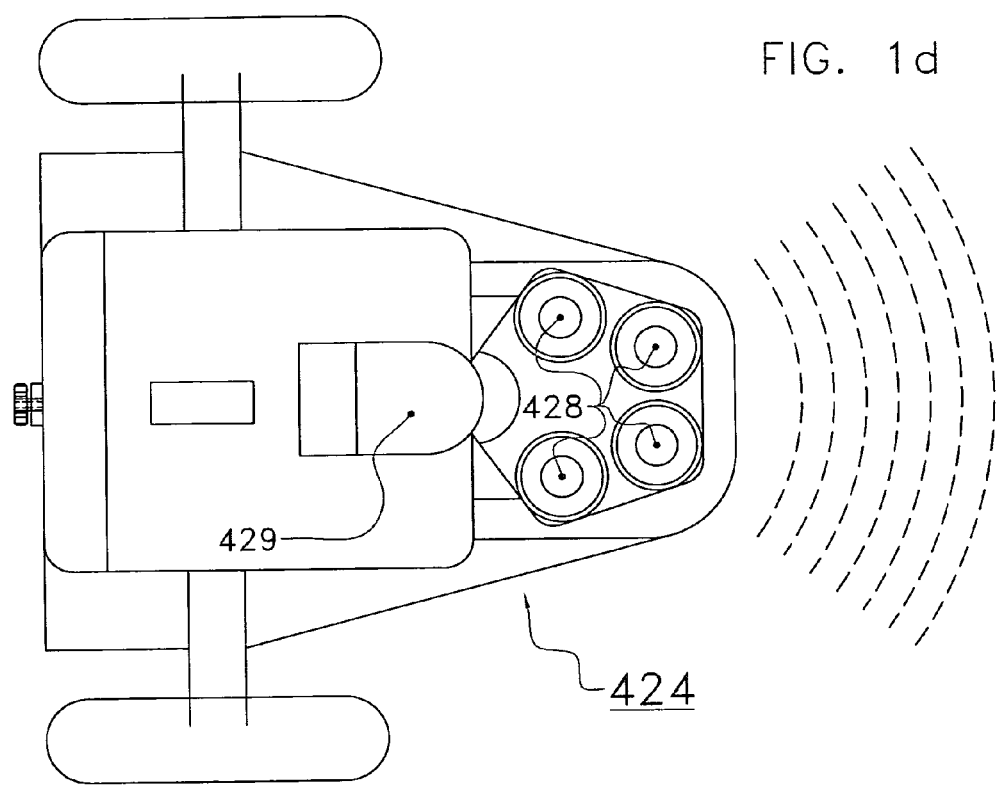
FIG. 1d shows diagrammatically a plan view of the mobile, autonomous teat-cup-carrying robot according to FIG. 1c.
Figure 1C:
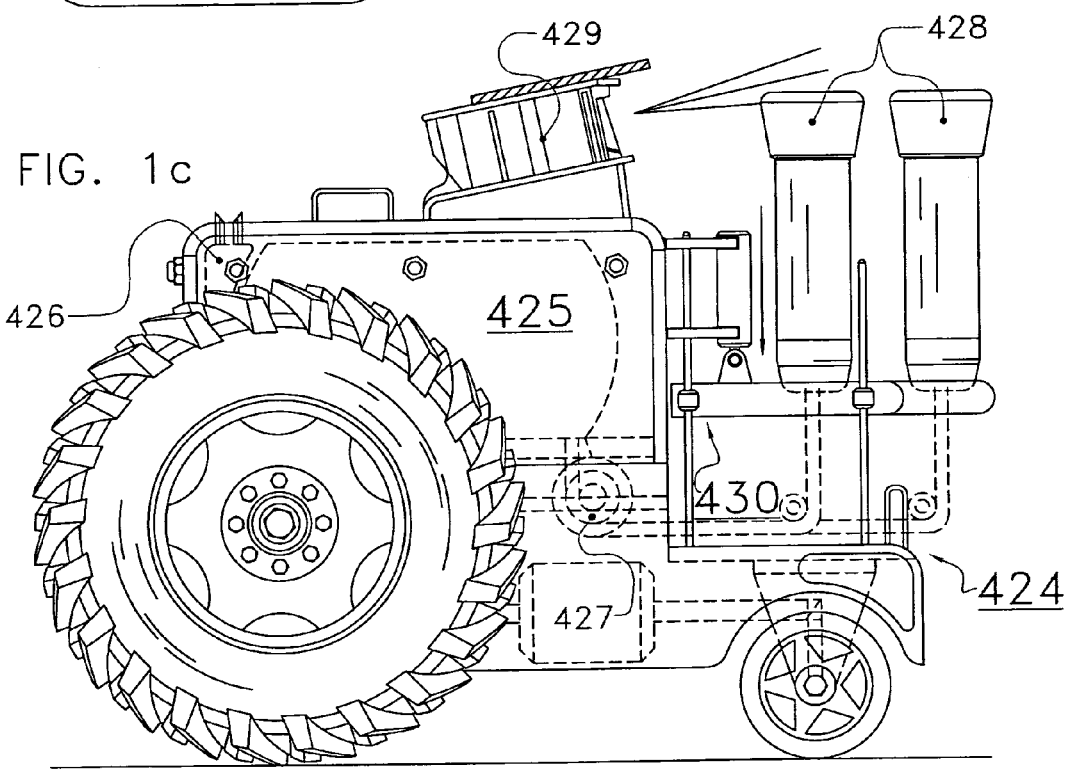
FIG. 1c shows diagrammatically in side view a mobile, autonomous teat-cup-carrying robot with integrated connecting device for automatically connecting teat cups.

As an alternative for a separate teat-cup-carrying robot and a separate teat-cup-connecting robot, FIGS. 1c and 1d show diagrammatically a mobile, autonomous teat-cup-carrying robot 424 with an integrated teat-cup-connecting device. The robot 424 is provided with a milk storage vessel 425, with energy supply means 426 for the robot and the relevant components, with an underpressure and/or overpressure system 427 for teat cups 428, with (non-shown) milk-analyzing means, and with (non-shown) navigation means and a control unit for controlling the robot and the relevant components. There is also disposed a position-determining device 429 for determining the position of a teat of a cow. Under the control of the milking system control unit the robot 424 is moved towards a cow to be milked, where the teat cups are connected to the relevant teats. The position of the teat relative to the teat cup 428 is then determined by the position-determining device 429, such as a laser sensor for detecting the position of the teats of the animal to be milked. A lifting device 430 for the teat cup 428 makes it possible for the teat cup 428 to be connected, by means of a substantially vertical movement, to the teat of the cow.

Figure 2:
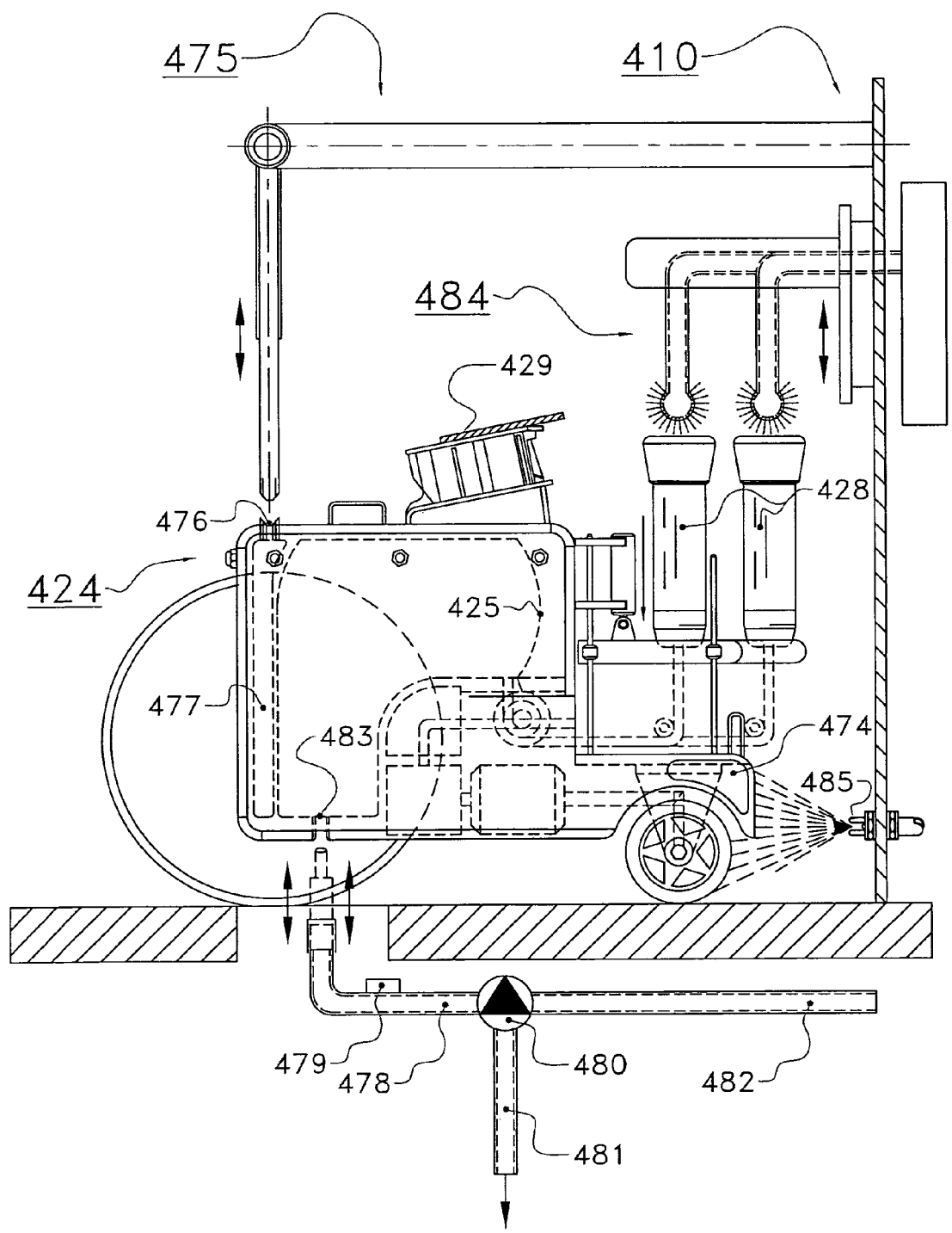
FIG. 2 shows diagrammatically a partially cross-sectional side view of a mobile teat-cup-carrying robot coupled to a multifunctional robot-treatment station.

FIG. 2 shows diagrammatically a partially cross-sectional side view of a mobile robot, in the embodiment shown the teat-cup-carrying robot 424 with an integrated teat-cup-connecting device, coupled to a multifunctional robot-treatment station 410. After having milked a cow, the robot 424 moves automatically to the multifunctional robot-treatment station 410. In this case there is made use of the position-determining means 429. The multifunctional robot-treatment station 410 comprises a charging device 475 that is capable of being coupled automatically to the charging port 476 of the rechargeable energy supply 477 of the robot 424. There is provided a coupling detector which, upon detection of coupling of the charging device 475 to the charging port 476, activates the recharging.

The multifunctional robot-treatment station 410 also comprises a milk outlet 478 for discharging milk from the milk storage vessel 425 of the robot 424. The milk outlet 478 comprises a sensor 479 for measuring the quality of the milk and for controlling a valve 480, in order to discharge milk that is suitable for human consumption to a milk tank via the milk tank outlet 481, or alternatively to discharge milk via an other outlet 482 to an other storage element. The milk outlet 478 is capable of being coupled automatically to the outlet 483 of the milk storage vessel 425. Also in this case there is provided a coupling detector for discharging the milk from the milk storage vessel 425 after a successful coupling has been detected.

After the milk has been discharged from the milk storage vessel 425, a teat-cup-cleaning device 484 comprising downwardly directed thorns having fluid outflow apertures at their ends is brought into the teat cups 428. The valve 480 is controlled in such a way that cleaning fluid can be discharged via the other outlet 482.

The multifunctional robot-treatment station 410 further comprises a robot-cleaning device 485 comprising in the embodiment shown a sprayer for cleaning the robot.

It will be obvious that, depending on the robot, the multifunctional robot-treatment station may comprise other components for the maintenance and cleaning of the robot.

FIGS. 3 to 7 show various possible feeding platforms and milking assemblies in which the teat cup carrier of the present invention may be used. Such assemblies are further described in co-pending U.S. patent application Ser. No. . . . filed concurrently herewith entitled "An assembly for and a method of feeding and milking animals" and claiming priority from Dutch application number 1024521 filed on 13 Oct. 2003. The contents of this co-pending application are hereby incorporated by reference in their entirety.

Figure 3:
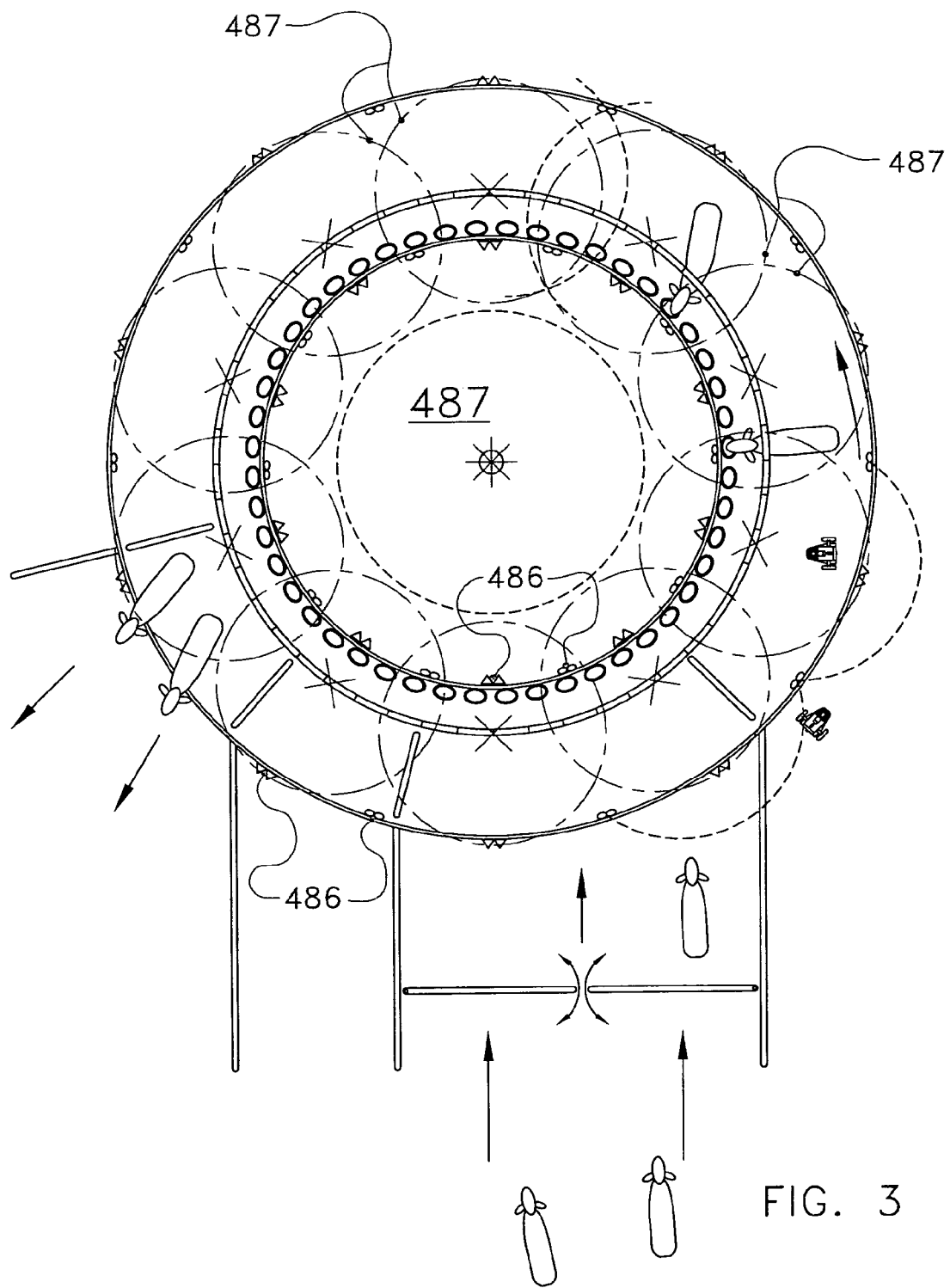
FIG. 3 shows diagrammatically in plan view a camera monitoring system for a feed platform and mobile teat cup carriers according to the invention.

FIG. 3 shows cameras (or comparable following means) for monitoring the feed platform and following mobile units (in particular cows and mobile robots). Such cameras with associated software in the computer system may be used for monitoring the mobile units, and for identification, orientation and position determination of the mobile units. FIG. 3 shows diagrammatically in plan view a camera monitoring system for a feed platform with position marks 486. The position marks 486 serve as position beacons, so that the camera monitoring system is capable of exactly determining the rotation position of the feed platform relative to the stationary world. The camera monitoring system comprises cameras which are disposed above the feed platform and have a field of vision that is shown in the figure by means of circles 487. The fields of vision overlap one another and cover the entire feed platform, the area on the inside of the feed platform and a strip on the outside beside the feed platform. The camera monitoring system is used to determine the exact position of the robots, if any, and to check same, and to determine the position of an animal on the feed platform. The data from the camera monitoring system are also used for the operation and control of the mobile teat-cup-carrying robots.

Although the teat-cup-carrying robot according to the invention is capable of co-operating with any feed platform known per se with teat cups disposed thereon, the invention may in particular be applied to feed platforms without teat cups, some embodiments of which will be described hereinafter.

Figure 4:
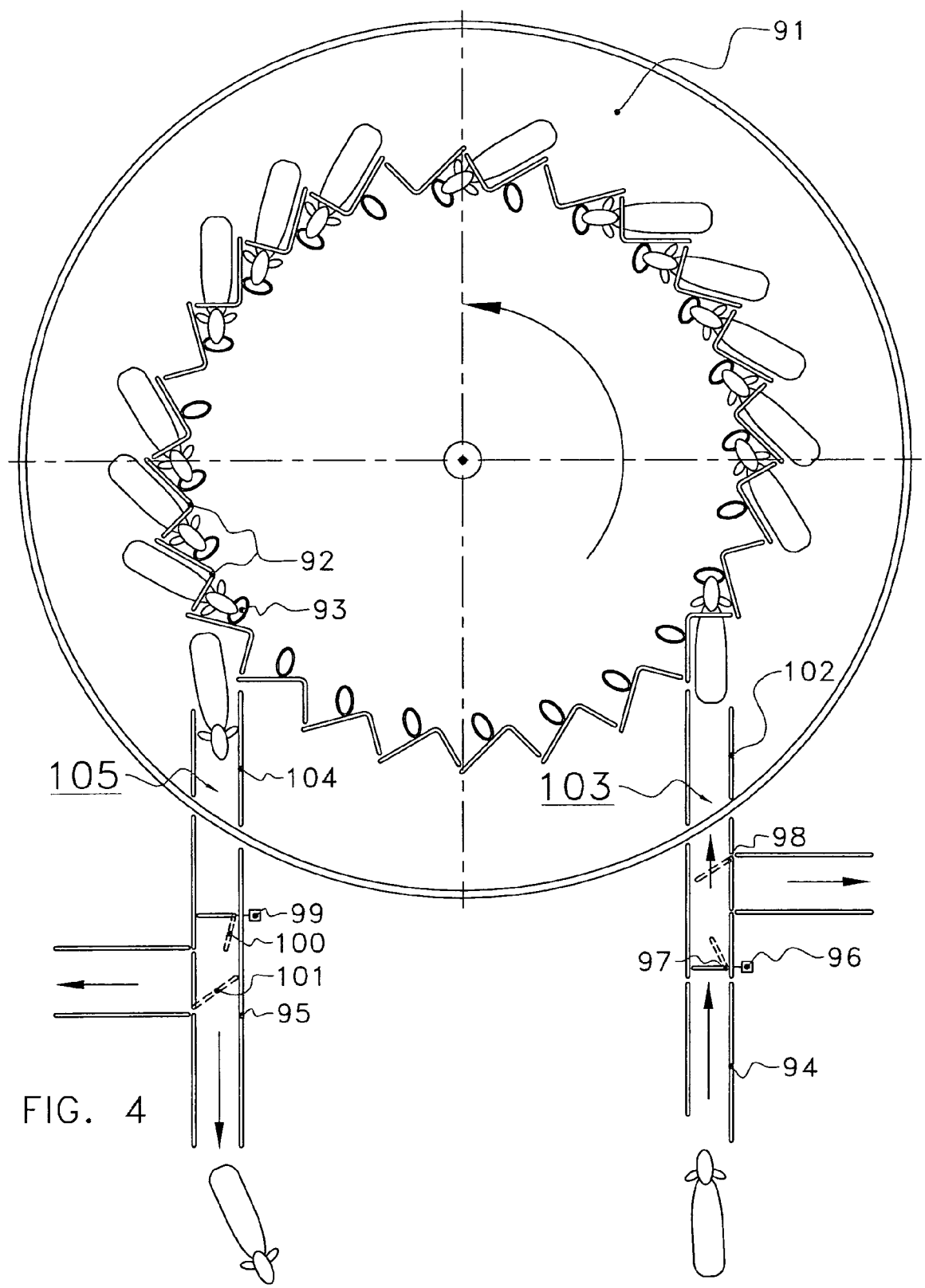
FIG. 4 shows diagrammatically in plan view a movable platform that is substantially disc-shaped, the platform being provided with separating means for partially separating animals.

FIG. 4 shows diagrammatically in plan view a part of an embodiment of a movable feed platform 91 that is shown as a substantially disc-shaped one. The feed platform 91 is provided with separating means 92 for partially separating cows. The separating means 92 adjoin a cow only on one side, so that a cow is not confined by the separating means 92. The feed platform 91 comprises feeding places, each having a feed trough 93 that is arranged in such a way that a cow is standing on the feed platform 91 under an angle with the radial. Owing to this, rotation of the shown feed platform 91 is only possible in one direction.

Via an entrance 94 and an exit 95 the cows can board or leave the feed platform 91 only one by one. At the entrance 94 there is arranged an animal-recognition device 96 by means of which the identity of a cow in the entrance 94 can be determined. The animal-recognition device 96 is used to control gates 97, 98 in such a way that the cows are admitted or are not admitted to the feed platform.

In the exit 95 there is also arranged an animal-recognition device 99 that controls an assembly of two gates 100, 101 for the purpose of separating cows.

Since the feed platform 91 is provided with separating means 92 that adjoin a cow only partially, a cow is enabled to walk freely to any feed trough 93 upon boarding the feed platform 91. It has been found that a cow usually chooses the most nearby feed trough 93. In the embodiment shown, however, there is disposed a deterring device 102 for deterring a cow in order to prevent a cow from moving about freely across the feed platform 91. In the embodiment shown, the deterring device 102 is constituted by guiding gates that are disposed stationarily, relative to the entrance 94, above the feed platform 91. A cow is thus prevented from crossing the transition of the feed platform portion 103 that is adjacent to the entrance 94 at the ends of the platform portion 103 in the direction of rotation of the feed platform 91 or in opposite direction. Analogously, there is provided such a deterring device 104 at the platform portion 105 that is adjacent to the exit 95. It is pointed out here that of the deterring device 102 the guiding gate that is located in the direction of rotation of the feed platform, i.e. the right hand gate in the drawing, is designed as a pivotable one, so that it allows a cow to pass by the pressure exerted by said cow. For example by spring pressure said gate pivots back to its initial position.

Figure 5:
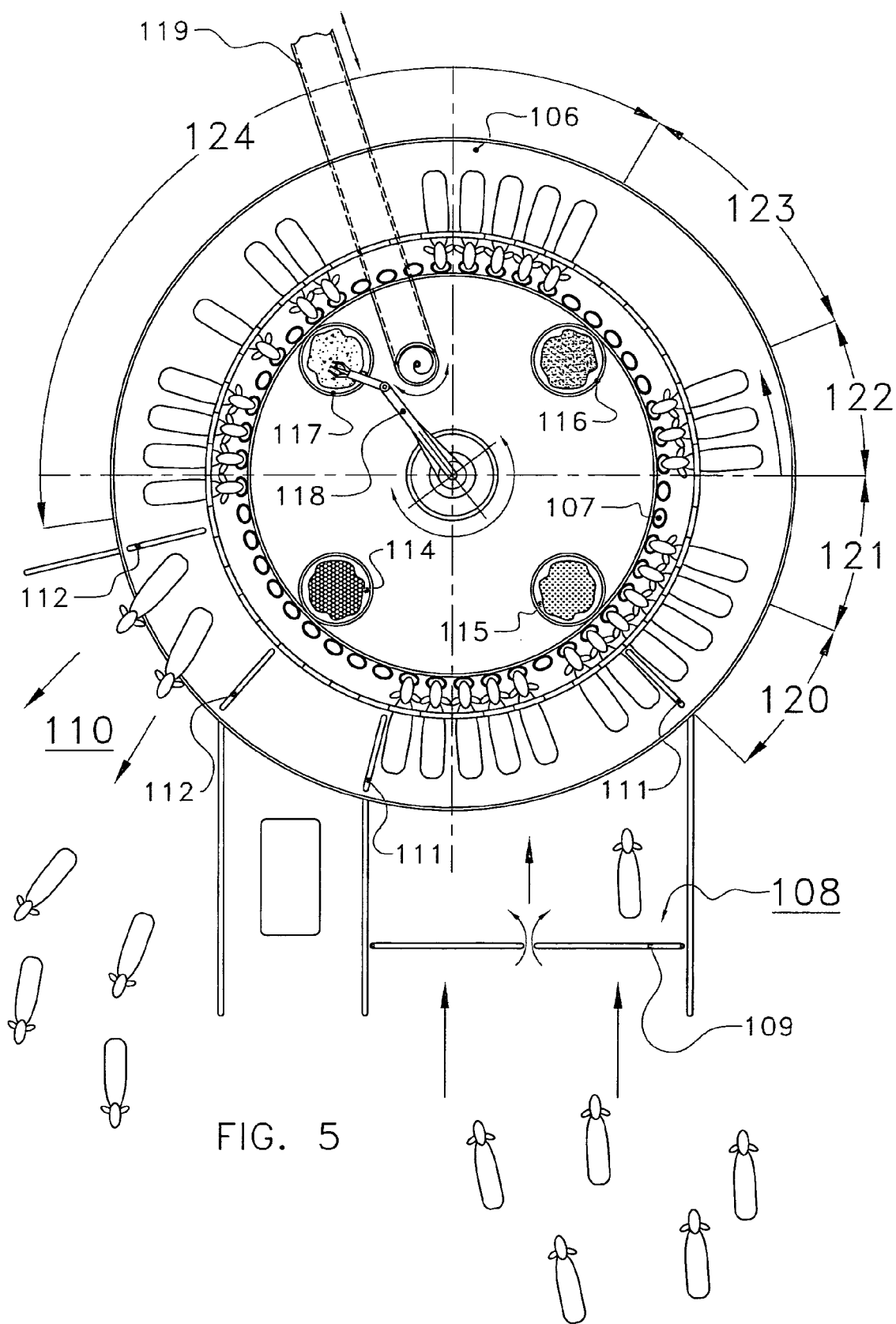
FIG. 5 shows diagrammatically in plan view an alternative embodiment of a movable platform that is substantially annular, the platform being free from confining means for confining animals.

FIG. 5 shows diagrammatically in plan view a part of an alternative embodiment of a movable feed platform 106 that is substantially annular. The feed platform 106 has a number of feeding places, each provided with its own feed trough 107 that is disposed in such a way that cows, when they are eating from the feed trough 107, are standing substantially radially on the feed platform 106, i.e. transverse to the usual direction of movement of the feed platform.

The embodiment shown in FIG. 5 has an entrance 108 with a gate 109, which entrance is sufficiently wide to allow several cows to board the feed platform 106 simultaneously. The exit 110 also has a width that suffices to allow several cows to debark from the feed platform 106 simultaneously. In contrast with the entrance 108, the exit 110 is free from a closing device, so that cows are able freely to debark from the feed platform 106.

The feed platform 106 is free from confining means for confining cows, so that the cows are able freely to walk to one of the feed troughs 107 via the entrance 108. Analogously to the embodiment of FIG. 4, there is provided a deterring device 111, respectively 112, to prevent cows from crossing freely the transition of the platform portion adjacent to the entrance, respectively the exit.

In the embodiment shown, inside the annular feed platform 106 four feed storage containers 114, 115, 116, 117 are arranged stationarily. A rotatable feed-gripping arm 118 is controlled by a (non-shown) feeding system control unit to convey feed from one (or more) of the feed storage containers 114, 115, 116, 117 to a feed trough 107. The feed storage containers 114, 115, 116, 117 are provided with feed via a supply system 119 that extends above the feed platform 106.

When a cow has boarded the feed platform 106, she will successively walk through the following areas, which are shown in FIG. 5 at the outer edge of the annular feed platform 106: a brushing area 120, a feeding area 121, a milking-pre-treatment area 122, a main milking area 123, and a feeding area 124.

After the entrance area a cow enters the brushing area 120 where by a (non-shown) cow brush the back of the cow is brushed, in order to make the cow feel at ease. Then the cow enters a feeding area 121 where no treatment is performed on the cow and where she can eat quietly. The teats of a cow are cleaned in the milking-pre-treatment area 122, then the teat cups are connected in the main milking area 123, after which the milking can take place. The teat cups are not provided on the feed platform 106 but are arranged beside the outer edge of the feed platform 106 on mobile, freely moving teat cup carriers that co-operate with the feed platform.

The feeding area 124 is dimensioned in such a way that, during the time a cow is present in the feeding area, the orifices of the teats of the cow will close at least for the greater part, and in this embodiment no treatment is performed on the cow in said area. In said feeding area 124 the cow can eat quietly, after which she can leave the feed platform 106 via the exit 110.

Figure 6:
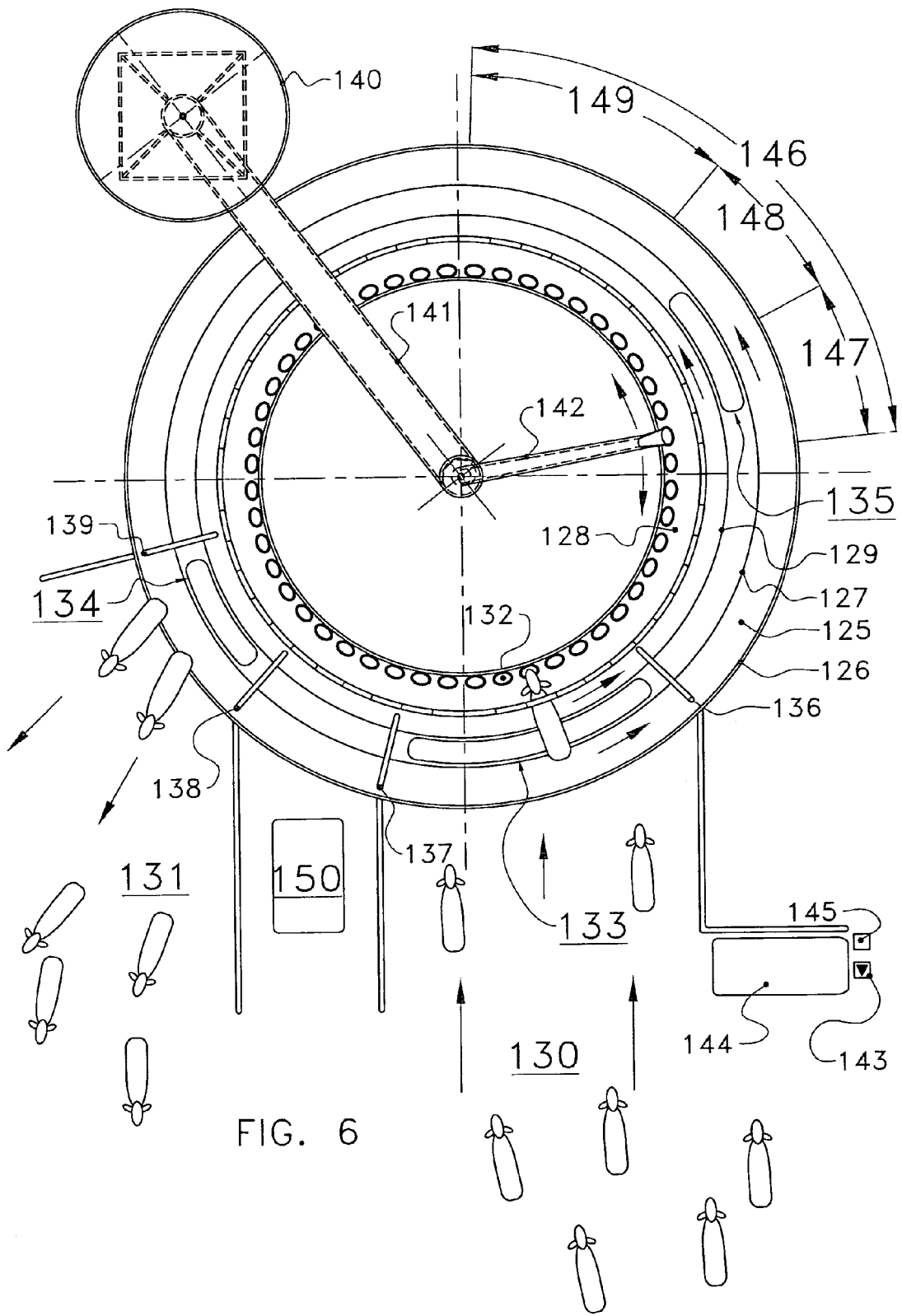
FIG. 6 shows diagrammatically in plan view a further alternative embodiment of a movable platform that comprises two annular platform units.

FIG. 6 shows diagrammatically in plan view a part of a further embodiment of a movable feed platform comprising an outer annular platform unit 125 with an edge 126 located on its outer side and with an inner edge 127, and an inner platform unit 128 with an outer edge 129 that is located at some distance from the inner edge 127 of the outer platform unit 125. The feed platform is arranged in such a way that, when a cow is eating in a feeding place, her front legs are standing on the inner platform unit 128 and her hind legs are standing on the outer platform unit 125. The outer platform unit 125 and the inner platform unit 128 are synchronously rotatable. Although the inner platform unit 128 is annular in this embodiment, it will be obvious that in an alternative, non-shown embodiment the inner platform unit may also be designed as a disc-shaped one.

Analogously to the embodiment of FIG. 5, the feed platform 125, 128 as shown in FIG. 6 is free from confining means for confining cows, although this embodiment of the invention may also be applied with confining means disposed between the feeding places. In this embodiment the assembly has an entrance 130 respectively an exit 131 that are both sufficiently wide to allow simultaneous access respectively exit of several cows. Both the entrance 130 and the exit 131 are free from a closing device, such as a gate, so that the cows are allowed freely to board and to debark from the feed platform 125, 128. The feeding places 132 on the feed platform are arranged in such a way that the cows are standing at least substantially radially on the feed platform during eating.

In the embodiment shown in FIG. 6, the assembly is provided with a first bridging element 133 for forming a bridge between the outer platform unit 125 and the inner platform unit 128, which first bridging element 133 is arranged opposite the entrance 130. A second bridging element 134 is arranged opposite the exit 131. The bridging elements 133, 134 ensure that a cow can normally board and debark from the feed platform. Outside the entrance 130 and the exit 131, between the platform units, there may be arranged a screen declining towards the outer edge 129, so that impurities, if any, do not fall between the feed platform units 125, 128.

In the embodiment shown in FIG. 6, there is provided a third bridging element 135, which functions as a support for an autonomous teat-cup-connecting robot.

Also in this embodiment, the assembly is provided with deterring devices 136, 137, 138, 139 preventing cows from walking on the platform beyond the entrance and the exit when boarding the feed platform and debarking from the feed platform.

In the embodiment shown in FIG. 6, only one sort of feed is supplied on the feed platform. For this purpose, there are provided a silo 140 as a feed storage container, and a conveyor 141 whose end 142 is rotatable in order to supply feed to feeding places 132 on the feed platform. In the embodiment shown, the feed platform 125, 128 is the only feeding area that is freely accessible to cows. The feeding system further comprises a feeding place 144 controlled by a control unit 143, which feeding place may be designed as a feeding column for example, and which feeding place, with the aid of an animal-recognition unit 145, decides on whether or not admitting a cow to the controlled feeding place 144. Said controlled feeding place 144 is arranged separately from the feed platform and is used to supply additional feed to cows, and, if desired, to supply certain additives, such as medicines and the like, mixed with the feed, to particular cows.

In this embodiment, the milking area 146 is subdivided into a pre-treatment area 147, a main milking area 148 and a post-treatment area 149 in which the teats of a cow are disinfected.

Between the exit 131 and the entrance 130 there is arranged an automatic cleaning device 150 for cleaning the feed platform, as will be explained hereinafter in further detail.

Figure 7:
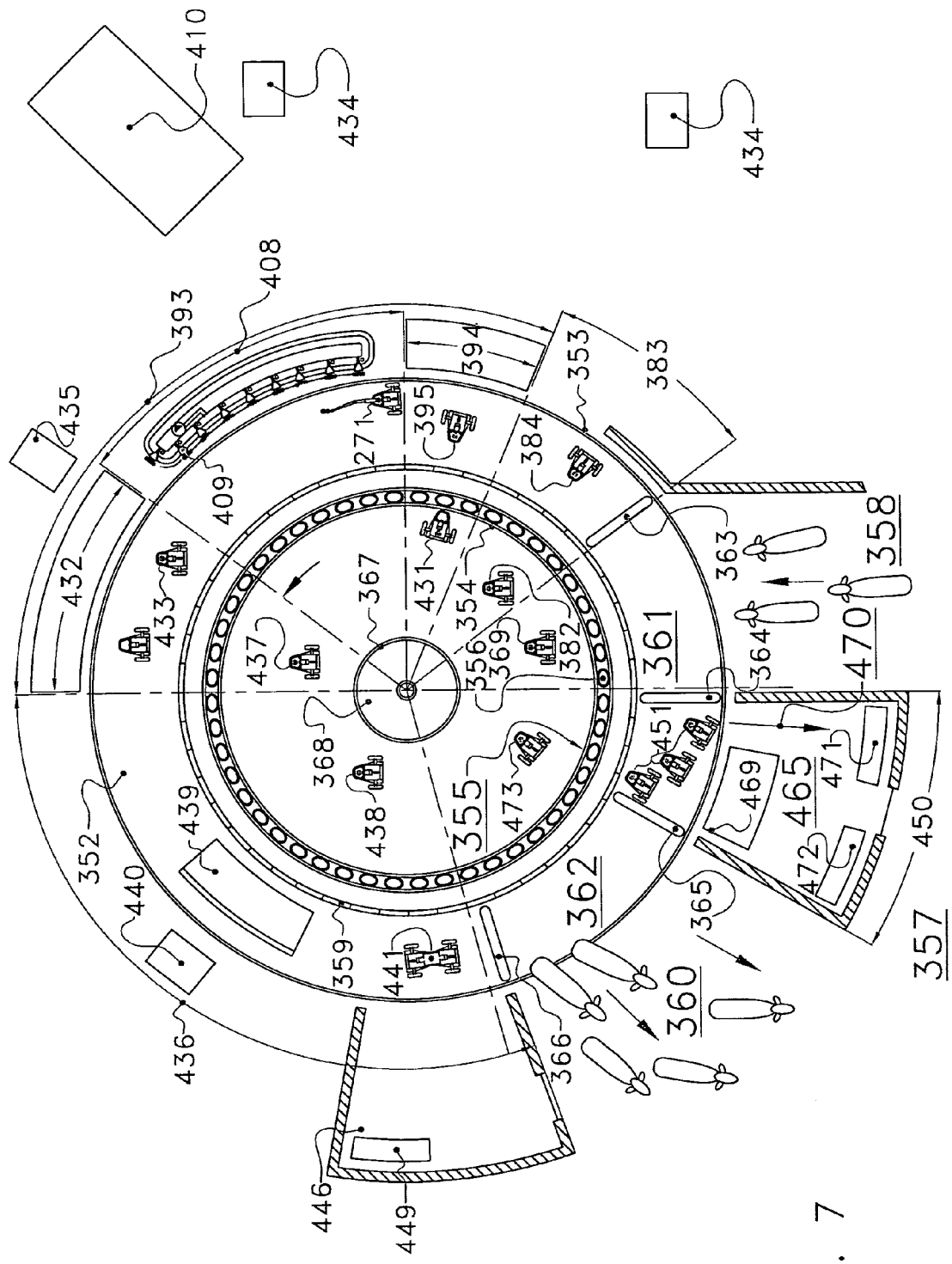
FIG. 7 shows diagrammatically a plan view of an assembly comprising a mobile teat-cup-carrying robot according to the invention.

FIG. 7 shows diagrammatically in plan view a further embodiment of an annular feed platform 352 that co-operates with inter alia freely movable teat cup carriers. The movable feed platform 352 has an outer edge 353 and an inner edge 354. The feed platform 352 comprises feeding places 355 with feed troughs 356 located on the inner edge 354 of the feed platform 352. The feed platform 352 is free from confining means for confining cows.

In an area 357 the cows are allowed to move about freely. Via an entrance 358 the cows are allowed to walk from the area 357 to the feed platform 352. The entrance 358 has a width that is sufficiently large to enable several cows to board the feed platform 352 simultaneously, and is free from a closing device. The feed platform 352 is free from sets of teat cups.

In the embodiment shown in FIG. 7 there is provided a locking feeding gate 359 for locking a cow in a feeding place 355. Although the locking feeding gate 359 may be a self-closing locking feeding gate known per se, the locking feeding gate 359 according to this embodiment is controlled by a locking control unit for controlling the locking feeding gate 359. The locking function of the locking feeding gate 359 is capable of being activated and deactivated by the locking control unit 158. The locking control unit 158 obtains data from cameras 159 which detect whether a cow is eating at a feed trough 356. Alternatively, the locking control unit may obtain information for activating the locking function from animal-recognition units which are disposed per feed trough and which are capable of determining whether a cow is present at a feed trough. Furthermore, a weighing device for weighing feed in the feed trough, which weighing device is capable of supplying information about whether or not feed is consumed from a feed trough, may be applicable within the invention to supply information to the locking control unit. It will be obvious that within the scope of the invention other forms of locking a cow in a feeding place may be applied as well, a neck-locking being in particular preferable for the purpose.

As shown in FIG. 7, the feed platform 352 has platform portions 361, 362 that are each time adjacent to the entrance 358 or the exit 360. Said platform portions 361, 362 are no fixed portions on the feed platform 352, but are those portions of the feed platform 352 that are adjacent to the entrance 358 and the exit 360. Viewed in the direction of rotation of the feed platform 352 and opposite to the direction of rotation of the feed platform 352, said platform portions 361, 362 have transitions 363, 364, 365, 366 at their ends. Each transition is provided with a deterring device for deterring a cow from crossing a relevant transition.

Centrally inside the annular feed platform 352 there is arranged a feed silo 367 comprising several feed storage containers 368 disposed around a central axis. Each feed storage container 368 may contain a different sort of feed. Each feed trough 356 is provided by a feed-supplying station 369 with a minimum amount of roughage before the feed trough 356 is located opposite the entrance 358. In the embodiment shown, the feed-supplying station 369 comprises a self-propelled (autonomous) mobile feed-supplying robot 369.

In order to prevent damage caused by collisions, the mobile robot is provided with a proximity detector, in the embodiment shown constituted by the orientation device 374, for detecting the proximity of an object. When an object comes too near and a collision threatens to take place, then a protecting device 381 for protecting at least a part of the robot 369 can be brought from an inactive position into an active protecting position. In this case inflatable or shiftable protecting means may be used. Bringing a protecting device from an inactive position into an active protecting position is controlled with the aid of data from the proximity detector 374. Such a proximity detector is known per se and may alternatively comprise a camera, an approach sensor or the like.

The mobile robot 369 is further provided with a malfunction detector (known per se and not shown in the drawing) for detecting an internal malfunction. In case of an occurring or expected malfunction, an alarm-signal-issuing device may issue an alarm signal.

After having walked through the first quiet area 383 (FIG. 7) the cow enters the first area of the milking area 393, which first area is called the pre-treatment area 394. In the embodiment shown, said pre-treatment area 394 covers three feeding places 355. In said pre-treatment area 394 a cow is subjected to a pre-treatment. Such a pre-treatment is known per se and comprises cleaning and/or massaging and/or stimulating the teats of a cow.

The robots may further comprise other components that have not been described in further detail in the foregoing. In this case a proximity detector for detecting the proximity of an object may be taken into account, it being possible for the proximity detector to be constituted by position-determining means or by a separate detector, for example an ultrasonic sensor or an approach sensor. The data from said detector may be used for the navigation of the relevant robot. A mobile robot may also be provided with a protecting device 474 (see FIG. 2) for protecting at least a part of the mobile robot, the protecting device 474 being capable of being brought from an inactive position into an active protecting position. As a protecting device may be applied for example an airbag or a telescopic bumper or cap or the like. In this case, it is advantageous for safety reasons if the protecting device is capable of being brought from an inactive position into an active protecting position with the aid of data from the proximity detector. The signal-issuing device 464 is also preferably capable of being activated with the aid of data from the proximity detector.

It is pointed out that, in an alternative, non-shown embodiment, it is possible for the mobile teat-cup-carrying robot to comprise cleaning devices for cleaning the teat cups or for cleaning the feed platform. If desired, the robot may comprise a storage container for impurities. The robot is then capable of conveying the impurities stored to a dung pit or to an other element suitable for storing and/or discharging impurities. It is further pointed out that in the embodiments described the teat cups are permanently connected to the teat-cup-carrying robot. However, it will be obvious that the teat-cup-carrying robot may alternatively be provided with a gripper for gripping teat cups from a stationary and/or a movable teat cup holder. In this alternative embodiment, the teat cup carrier carries the teat cups temporarily. Also in this embodiment, the teat cup carrier is designed to be able (during carrying the teat cups) to co-operate with a feed platform, which teat cup carrier is freely movable relative to the feed platform.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A teat cup carrier for carrying at least one teat cup for connection to a teat of an animal to be milked, the teat cup carrier being freely movable relative to a movable feed platform on which the animal is located, wherein the teat cup carrier is a self-propelled autonomous mobile teat-cup-carrying robot comprising a navigation device for directing the teat cup carrier on the movable feed platform, a control unit for controlling the functioning of the mobile teat-cup-carrying robot and wherein the control unit comprises a transmitting and receiving unit for communication with a further control unit of the feed platform.

2. The teat cup carrier as claimed in claim 1, further comprising a teat cup gripper for gripping and retaining the teat cup which is disposed on a teat cup holder.

3. The teat cup carrier as claimed in claim 2, wherein the teat cup holder is movable.

4. The teat cup carrier as claimed in claim 1, wherein the teat cup carrier comprises a connecting device for connecting the teat cup to the teat.

5. The teat cup carrier as claimed in claim 4, wherein the connecting device comprises a gripping device for gripping a teat cup that is disposed on the teat cup carrier.

6. The teat cup carrier as claimed in claim 1, wherein the teat cup carrier is provided with a teat-position-determining device for determining the position of the teat.

7. The teat cup carrier as claimed in claim 6, wherein the teat cup carrier comprises a connecting device for connecting the teat cup to the teat and the teat-position-determining device is disposed on the connecting device.

8. The teat cup carrier as claimed in claim 7, wherein the connecting device comprises a robot arm.

9. The teat cup carrier as claimed in claim 1, wherein the teat cup carrier comprises a drive that is controllable by the control unit.

10. The teat cup carrier as claimed in claim 1, wherein the navigation device comprises a position-determining device for determining the position of the teat cup carrier and for supplying position information.

11. A teat cup carrier for carrying at least one teat cup for connection to a teat of an animal to be milked, the teat cup carrier being freely movable between a movable feed platform defining a moving frame of reference and a stationary area around the feed platform defining a fixed frame of reference, movement of the teat cup carrier being controlled by a navigation device, operable to direct movement of the teat cup carrier in both the fixed and moving frames of reference wherein the freely movable teat cup carrier is a self-propelled autonomous mobile teat-cup-carrying robot and comprises a control unit for controlling the functioning of the mobile teat-cup-carrying robot and wherein the control unit comprises a transmitting and receiving unit for communication with a further control unit of the feed platform.

12. The teat cup carrier as claimed in claim 11, further comprising a teat cup gripper for gripping and retaining the teat cup which is disposed on a teat cup holder.

13. The teat cup carrier as claimed in claim 12, wherein the teat cup holder is movable.

14. The teat cup carrier as claimed in claim 11, wherein the teat cup carrier is provided with a connecting device for connecting the teat cup to the teats of an animal that is present on the feed platform.

15. The teat cup carrier as claimed in claim 14, wherein the connecting device is provided with a gripping device for gripping a teat cup that is disposed on the teat cup carrier.

16. The teat cup carrier as claimed in claim 11, wherein the teat cup carrier comprise a teat-position-determining device for determining the position of a teat of an animal that is present on the feed platform.

17. The teat cup carrier as claimed in claim 16, wherein the teat cup carrier comprises a connecting device for connecting the teat cup to the teat and wherein the teat-position-determining device is disposed on the connecting device.

18. The teat cup carrier as claimed in claim 17, wherein the connecting device comprises a robot arm.

19. The teat cup carrier as claimed in claim 14, wherein the teat cup carrier comprises a drive that is controllable by the control unit in response to the navigation device.

20. The teat cup carrier as claimed in claim 11, wherein the navigation device comprises a position-determining device for determining the position of the teat cup carrier within the moving frame of reference and for supplying position information.

* * * * *